United States Patent
Iwasaki

(10) Patent No.: US 8,190,821 B2
(45) Date of Patent: May 29, 2012

(54) CACHE CONTROL APPARATUS, INFORMATION PROCESSING APPARATUS, AND CACHE CONTROL METHOD

(75) Inventor: Shinichi Iwasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 897 days.

(21) Appl. No.: 12/250,728

(22) Filed: Oct. 14, 2008

(65) Prior Publication Data

US 2009/0248982 A1    Oct. 1, 2009

(30) Foreign Application Priority Data

Mar. 26, 2008  (JP) ................................. 2008-080691

(51) Int. Cl.
*G06F 12/00*    (2006.01)
*G06F 13/00*    (2006.01)

(52) U.S. Cl. ........ 711/118; 711/100; 711/117; 711/154; 711/200

(58) Field of Classification Search .................. 711/100, 711/117, 118, 154, 200
See application file for complete search history.

(56) References Cited

U.S. PATENT DOCUMENTS

| | | | | |
|---|---|---|---|---|
| 5,615,332 A | * | 3/1997 | Yamamoto | 714/38.13 |
| 6,571,329 B1 | * | 5/2003 | Ukai et al. | 712/205 |
| 7,076,150 B2 | * | 7/2006 | Morinaga et al. | 386/279 |
| 7,613,710 B2 | * | 11/2009 | Bastawala et al. | 1/1 |
| 2001/0003839 A1 | | 6/2001 | Kondo | |
| 2002/0087804 A1 | | 7/2002 | Khare | |
| 2003/0084274 A1 | | 5/2003 | Gaither et al. | 712/235 |
| 2006/0036807 A1 | | 2/2006 | Watanabe | |

FOREIGN PATENT DOCUMENTS

| | | |
|---|---|---|
| EP | 1628209 | 2/2006 |
| JP | 2001-167077 | 6/2001 |
| JP | 2003-186669 | 7/2003 |

OTHER PUBLICATIONS

Extended European Search Report, mailed Jul. 1, 2009, in corresponding European Application No. 08167194.3 (6 pp.).

* cited by examiner

*Primary Examiner* — Tuan V. Thai
(74) *Attorney, Agent, or Firm* — Staas & Halsey LLP

(57) ABSTRACT

A cache control apparatus determines whether to adopt or not data acquired by a speculative fetch by monitoring a status of the speculative fetch which is a memory fetch request output before it becomes clear whether data requested by a CPU is stored in a cache of the CPU and time period obtained by adding up the time period from when the speculative fetch is output to when the speculative fetch reaches a memory controller and time period from completion of writing of data to a memory which is specified by a data write command that has been issued, before issuance of the speculative fetch, for the same address as that for which the speculative fetch is issued to when a response of the data write command is returned.

16 Claims, 5 Drawing Sheets

FIG. 2A

| I (Invalid) | SPECULATIVE FETCH HAS NOT BEEN OUTPUT |
|---|---|
| U (Undefined) | SPECULATIVE FETCH HAS BEEN OUTPUT |
| C (Cancel) | SPECULATIVE FETCH HAS BEEN OUTPUT FOLLOWED BY DISCARD OF DATA |
| A (Accept) | SPECULATIVE FETCH HAS BEEN OUTPUT FOLLOWED BY ADOPTION OF DATA |

FIG. 2B

| Request ID | Status |
|---|---|
| 1 | A |
| 2 | U |
| 3 | I |
| 4 | I |

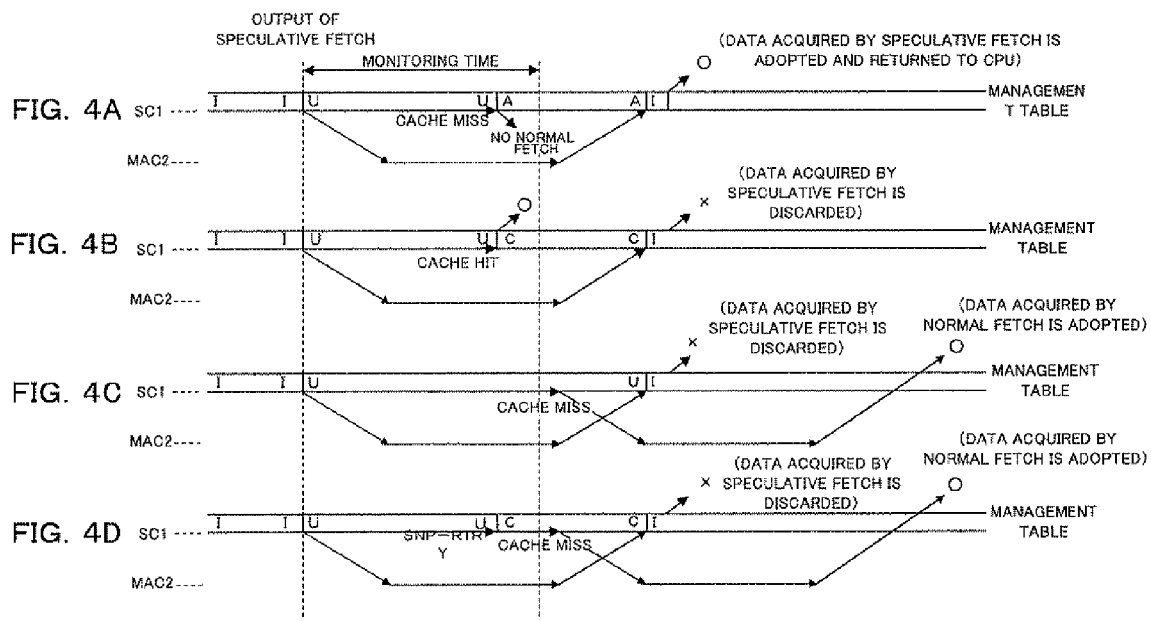

CACHE CONTROL APPARATUS, INFORMATION PROCESSING APPARATUS, AND CACHE CONTROL METHOD

BACKGROUND

1. Field

One aspect of the present invention relates to a cache control apparatus for controlling data transmission between a CPU and a memory, an information processing apparatus provided with the cache control apparatus, and a cache control method.

2. Description of the Related Art

In recent years, the operating frequency of an LSI is being increased remarkably and, as a result, memory access time is relatively larger than the processing time in the LSI.

As a countermeasure against the above problem, there is performed a speculative fetch in which a system controller (hereinafter, referred to as "SC") that receives a memory fetch request from a CPU or an I/O controller issues a memory fetch request to a memory controller (hereinafter, referred to as "MAC") before it becomes clear whether requested data is stored or not in a cache of the CPU.

That is, the SC retains inside thereof tag information of data, such as address or update state, stored in the cache of every CPU and searches (snooping) for the tag information to perform a speculative memory access at a stage before it becomes clear whether data requested in a memory fetch request is stored or not in the cache of the CPU. The speculative fetch allows an early start of the memory access operation, thereby reduces a memory access waiting time, latency in other words, if the data does not exist in the cache.

There have been known methods for reducing the memory access latency. For example, a method that speculatively accesses a memory in a system in parallel with reading out from a tag memory, tag information which is information concerning a data storage state of a cache memory provided in the system and determines whether to discard or not data acquired from the memory by the speculative reading based on the read out tag information have been known. Further, there is known a mechanism that retains response data corresponding to a speculative fetch in a given location in a system so as to wait for a result of cache search made by a CPU, based on which it is determined whether to adopt or not the response data corresponding to the speculative fetch and a method that processes a speculative request so that convergence and collision due to non-speculative traffic are reduced There are several related arts discussing on the speculative fetch.

Patent Document 1: Jpn. Pat. Appln. Laid-Open Publication No. 2001-167077.

Patent Document 2: Jpn. Pat. Appln. Laid-Open Publication No. 2003-186669.

In the case where a conventional speculative fetching method is applied to a system including a memory control apparatus that gives preference to a fetch command having a smaller packet length over a command having a longer packet length, such as an STR (Store: command of writing data in a memory), when a fetch request and an STR request for the same address conflict with each other (access requests are made to the same address), ordering between requests exchanged in the system cannot be maintained.

With reference to FIGS. 5A and 5B each showing a timing at which the speculative fetch is transmitted after the STR command has been made, a further description of the ordering between requests will be given. Note that FIG. 5A shows a successful example of the speculative fetch, and FIG. 5B shows a failed example thereof. In FIGS. 5A and 5B, the horizontal axis represents time.

When the STR command is issued from the CPU, the SC notifies the MAC of the STR command to thereby update data in the memory (transition from OLDDATA to NEWDATA in MAC).

In the case of FIG. 5A, data has already been updated at the time point when the speculative fetch is issued and reaches the MAC, so that the data acquired by the speculative fetch can be adopted without problems.

On the other hand, in the case of FIG. 5B, unupdated data (OLDDATA) before STR is read out although NEWDATA should be readout under normal circumstance. Thus, when the data acquired by the speculative fetch is adopted, a problem arises.

Further, in the above method that retains data acquired by the speculative fetch in the system, it is necessary to temporarily store the acquired data in a buffer in the SC and wait for a snoop result before determining whether to adopt or not the response data corresponding to the speculative fetch. Thus, the buffer size needs to be increased, which unfavorably results in an increase in the LSI size and power consumption.

Further, when the speculative fetch results in failure, bus throughput is lowered accordingly. Therefore, it is necessary to reduce the number of times of failure in the speculative fetch as much as possible.

SUMMARY

One aspect of the present invention has been made to solve the above problems, and an object thereof is to provide a cache control apparatus, an information processing apparatus, and a cache control method that guarantees the ordering between requests by retaining a status of the speculative fetch for a predetermined monitoring time.

According to a first aspect of the present invention, there is provided a cache control apparatus including: a speculative fetch output section that outputs a speculative fetch which is a memory fetch request output before it becomes clear whether data requested by a CPU is stored in a cache provided in the CPU; a table that retains information concerning the speculative fetch and statuses of the speculative fetch; a tag information search section that searches tag information including a list of information concerning data stored in the cache for cache hit information; a status update section that updates, at the time of completion of the search by the tag information search section the status of the speculative fetch in the table to a predetermined status in the case where the search results in a cache miss; a status update determination section that determines, when acquiring data acquired by the speculative fetch output from the speculative fetch output section, whether the status of the speculative fetch retained in the table has been updated to the predetermined status by the status update section within the time period obtained by adding up the time period from when the speculative fetch is output to when the speculative fetch reaches a memory controller for controlling data communication between a memory and a device outside the memory and time period from completion of writing of data to the memory which is specified by a data write command that has been issued, before issuance of the speculative fetch, for the same address as that for which the speculative fetch is issued to when a response of the data write command is returned; and a data adoption determination section that determines whether to adopt or not the data acquired by the speculative fetch output by the speculative fetch output section based on a result of the determination by the status update determination section.

According to a second aspect of the present invention, there is provided an information processing apparatus including: at least one CPU containing a cache; a memory that stores data; a memory controller that controls data communication between the memory and a device outside the memory; a speculative fetch output section that outputs a speculative fetch which is a memory fetch request output to the memory through the memory controller before it becomes clear whether data requested by the CPU is stored in the cache in the CPU; a table that retains information concerning the speculative fetch and statuses of the speculative fetch; a tag information search section that searches tag information including a list of information concerning data stored in the cache for cache hit information; a status update section that updates, at the time of completion of the search by the tag information search section, the status of the speculative fetch in the table to a predetermined status in the case where the search results in a cache miss; a status update determination section that determines, when acquiring data acquired by the speculative fetch output from the speculative fetch output section, whether the status of the speculative fetch retained in the table has been updated to the predetermined status by the status update section within the time period obtained by adding up the time period from when the speculative fetch is output to when the speculative fetch reaches the memory controller and time period from completion of writing of data to the memory which is specified by a data write command that has been issued, before issuance of the speculative fetch, for the same address as that for which the speculative fetch is issued to when a response of the data write command is returned; and a data adoption determination section that determines whether to adopt or not the data acquired by the speculative fetch output by the speculative fetch output section based on a result of the determination by the status update determination section.

According to a third aspect of the present invention, there is provided a cache control method including: a speculative fetch output step that outputs a speculative fetch which is a memory fetch request output before it becomes clear whether data requested by a CPU is stored in a cache provided in the CPU; a tag information search step that searches tag information including a list of information concerning data stored in the cache for cache hit information; a status update step that updates, at the time of completion of the search by the tag information search step, the status of the speculative fetch in a table that retains information concerning the speculative fetch and statuses of the speculative fetch to a predetermined status in the case where the search results in a cache miss; a status update determination step that determines, when acquiring data acquired by the speculative fetch output by the speculative fetch output step, whether the status of the speculative fetch retained in the table has been updated to the predetermined status by the status update step within the time period obtained by adding up the time period from when the speculative fetch is output to when the speculative fetch reaches a memory controller for controlling data communication between a memory and a device outside the memory and time period from completion of writing of data to the memory which is specified by a data write command that has been issued, before issuance of the speculative fetch, for the same address as that for which the speculative fetch is issued to when a response of the data write command is returned; and a data adoption determination step that determines whether to adopt or not the data acquired by the speculative fetch output by the speculative fetch output step based on a result of the determination by the status update determination step.

By performing speculative fetch operations, it is possible to reduce memory fetch latency, as well as to guarantee the ordering between a speculative fetch and a write command which are issued for the same address.

BRIEF DESCRIPTION OF THE DRAWINGS

FIGS. 2A and 2B are views showing statuses of a speculative fetch (FIG. 2A) and information retained in a management table (FIG. 2B) in the present embodiment;

FIGS. 4A to 4D are views showing a successful example of the speculative fetch and failed examples thereof in the present embodiment.

DETAILED DESCRIPTION OF THE PREFERRED EMBODIMENTS

Figure 1:
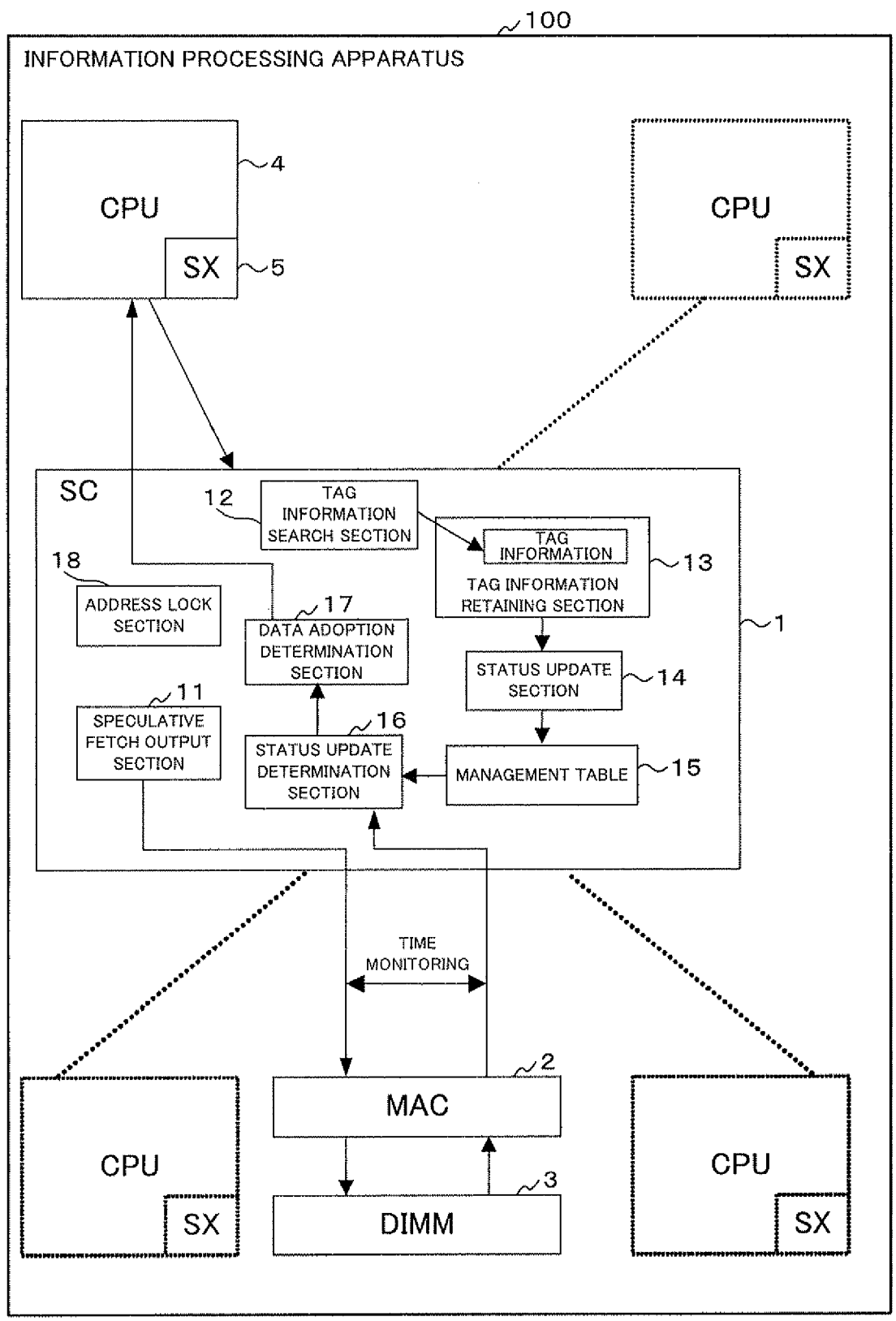
FIG. 1 is a view showing an example of a configuration of an information processing apparatus according to an embodiment of the present invention.

An information processing apparatus according to an embodiment of the present invention is shown in FIG. 1.

An information processing apparatus 100 of FIG. 1 includes a CPU (Central Processing Unit) 4 functioning as an arithmetic processing unit containing a 2nd-cache (SX 5) storing a copy of the content of a memory, a DIMM (Dual Inline Memory Module) 3 serving as a storage medium (memory) for storing data, and a MAC 2 (memory controller) which is an LSI for controlling data communication between the DIMM 3 and a device outside the DIMM 3. The information processing apparatus 100 further includes a system controller SC 1 which is a controller for determining whether data requested by the CPU 4 is stored in a cache. The information processing apparatus 100 includes a plurality of CPUs in addition to the CPU 4, and the SC 1 performs the same determination control for these CPUs.

The details of the SC 1 will next be described. The SC 1 includes a speculative fetch output section 11, a tag information search section 12, a tag information retaining section 13, a status update section 14, a management table 15, a status update determination section 16, a data adoption determination section 17, and an address lock section 18.

The speculative fetch output section 11 outputs a speculative fetch. The speculative fetch is a speculative memory fetch request that is output to the DIMM 3 via the MAC 2 before it becomes clear whether data requested by the CPU 4 is stored in the cache as described above.

The tag information retaining section 13 retains tag information which is a copy of a tag of data retained in the SX5, i.e., a list of information concerning data stored in the cache.

The tag information search section 12 searches, or snoops in other words, the tag information retaining section 13 for cache hit tag information. It is assumed here that the speculative fetch output section 11 outputs the speculative fetch at the timing at which the tag information search section 12 starts the search processing. The timing at which the speculative fetch is output and timing at which the speculative fetch output section 11 and the tag information search section 12 starts the search processing can be said to be the same if a differential delay inevitably occurring is not considered.

The management table 15 retains information concerning the speculative fetch. The information in the management table 15 includes a request ID assigned to each speculative fetch and a status thereof. The details of the status will be described later.

The status update section 14 updates, when the tag information search section 12 performs the search, the status in the management table 15 to "Accept" in the case where the search results in a cache miss. Further, the status update section 14 updates the status in the management table 15 to statuses other than "Accept" if required.

The status update determination section 16 acquires the data that has been acquired by the speculative fetch output from the speculative fetch output section 11, and determines whether the status of any request ID retained in the management table 15 has been updated within a predetermined monitoring time by the status update section 14. In this determination, the status update determination section 16 at least determines whether the status has been updated to "Accept".

The data adoption determination section 17 determines whether to adopt or not the data that has been acquired by the speculative fetch output from the speculative fetch output section 11 based on the determination result of the status update determination section 16. That is, in the case where the status update determination section 16 has determined that the status has been updated to "Accept", the data adoption determination section 17 adopts the data that has been acquired by the speculative fetch output from the speculative fetch output section 11, while in the case where the status update determination section 16 has determined that the status has not been updated to "Accept", the data adoption determination section 17 discards the data that has been acquired by the speculative fetch.

The address lock section 18 is an address lock register that retains the address of a data write destination specified by an STR (Store) command, that is a data write command, to lock access to the data write destination address when the STR command is being executed. Note that when the number of addresses retained by the address lock section 18 exceeds a predetermined number, the speculative fetch output section 11 does not output the speculative fetch.

Although the respective sections in the SC 1 are implemented by LSIs provided in the SC 1, they may be implemented by a hardware resource such as an arithmetic processing unit (microcomputer, etc.) and a storage medium, or by cooperation of a hardware resource and a software resource such as firmware. In this case, the respective sections may utilize, as a hardware resource, an external hardware resource such as the CPU 4 and DIMM 3.

The outline of processing performed by the SC 1 in the present embodiment is as follows.

Processing 1: The SC 1 receives a memory fetch command from a given CPU (CPU 4, in the case of the present embodiment).

Processing 2: The speculative fetch output section 11 issues a speculative fetch to the MAC 2 in parallel with the snooping performed by the tag information search section 12.

Processing 3: Adoption/discard is determined without storing response data corresponding to the speculative fetch in the SC 1 and, when data is determined to be adopted, the SC 1 sends back the data to the CPU. Processing 3 is performed by the status update section 14, management table 15, status update determination section 16, and data adoption determination section 17.

The content of the status of the speculative fetch and information retained in the management table 15 will be described with reference to FIG. 2.

As shown in FIG. 2A, the speculative fetch has four statuses: "I" (Invalid), "U" (Undefined), "C" (Cancel), and "A" (Accept).

"I" indicates a state where the speculative fetch output section 11 has not outputted the speculative fetch or a default initial state. "U" indicates a state where the speculative fetch has been output but whether to adopt or discard data acquired by the speculative fetch has not been determined. "C" indicates a state where the speculative fetch has been output and data acquired by the speculative fetch has been determined to be discarded. "A" indicates a state where the speculative fetch has been output and data acquired by the speculative fetch has been determined to be adopted since a cache miss, i.e., a state where no data exists in the cache, occurs. Note that the status "C" is not indispensable.

FIG. 2B shows an example of information retained in the management table 15. The management table 15 stores a correspondence between the request ID assigned to the speculative fetch and any of abovementioned statuses. The request ID is assigned every time a fetch request reaches the SC 1 so as to be managed in the SC 1. The management table 15 retains the number of the correspondences equal to the number of fetch requests received from the CPU. In the present embodiment, as shown in FIG. 2B, the management table 15 is assumed to retain four correspondences between the request ID and status.

The status update section 14 updates the status from "I" to "U" when the speculative fetch output section 11 outputs a speculative fetch, and updates the status from "U" to "A" when the search by the tag information search section 12 results in a cache miss. Further, the status update section 14 updates the status from "U" to "C" when the search by the tag information search section 12 results in a cache hit. In addition, the status update determination section 16 refers to the management table 15 when a speculative fetch response is returned from the MAC 2 and determines whether the status corresponding to the speculative fetch is "A" within a monitoring time the details of which will be described later. The data adoption determination section 17 adopts a packet (data) acquired by the speculative fetch only when the determination result is "A" and, otherwise, discards a packet.

The monitoring time, which is another determination criterion used in the status update determination section 16, will next be described.

Figure 5A:
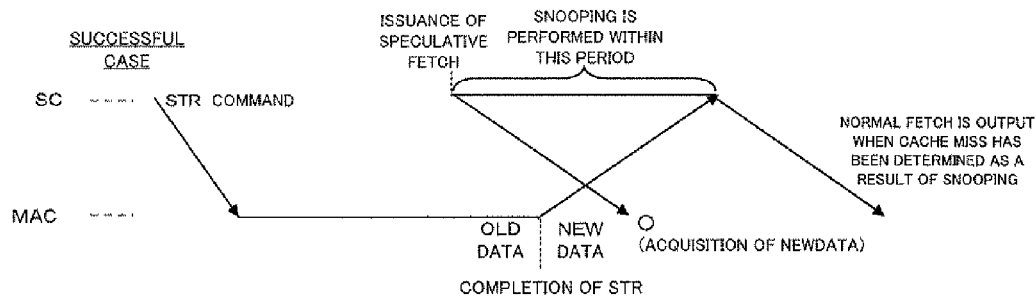
FIGS. 5A and 5B are views showing a conventional successful example of the speculative fetch and a failed example thereof.
Figure 5B:
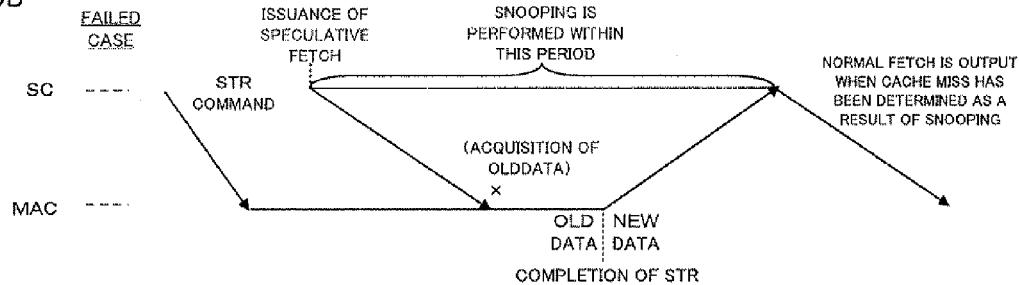

In the case where the speculative fetch has passed the processing corresponding to the preceding STR command for the same address as shown in FIG. 5B, data acquired by the speculative fetch must be discarded since it is old data that is not updated. In the present embodiment, whether the speculative fetch has passed the processing corresponding to the preceding STR command for the same address is determined by providing the monitoring time.

Figure 3:
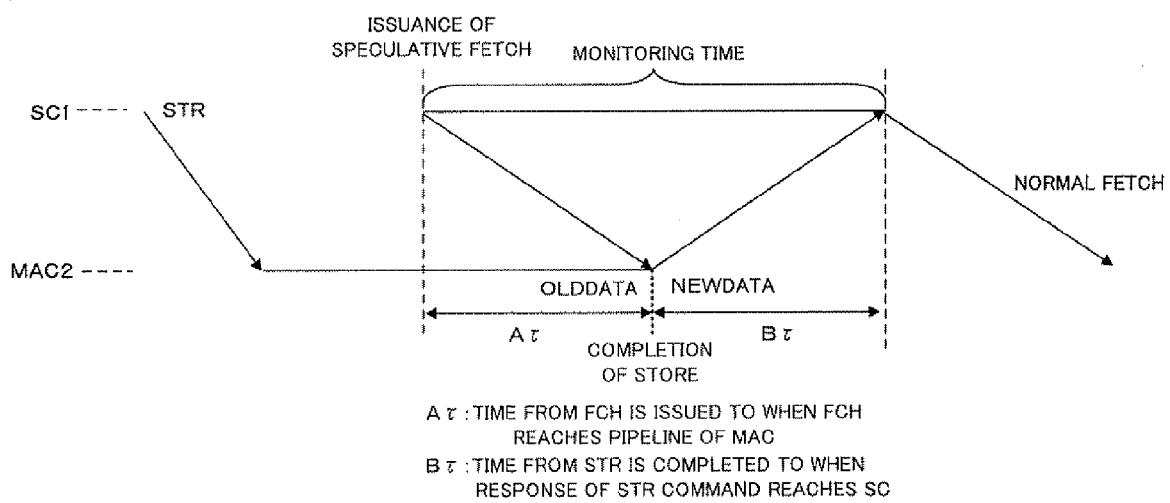
FIG. 3 is a view for explaining a monitoring time within which ordering guarantee is made by time monitoring in the present embodiment.

FIG. 3 is a view for explaining the monitoring time. In order to adopt data acquired by the speculative fetch, it is sufficient that data has been updated by the preceding STR command when the speculative fetch from the SC 1 reaches the MAC 2.

The time from when the speculative fetch (FCH) is issued to when the speculative fetch reaches the pipeline of the MAC 2, i.e., time from when the speculative fetch is issued to when the speculative fetch reaches the memory controller is assumed to be $\Delta\tau$. The time from when data of DIMM 3 is updated to complete the STR command to when the response notifying the SC 1 of the completion of the STR command reaches the SC 1, i.e., time from completion of writing of data to the DIMM 3 which is specified by the STR command that has been issued, before output of the speculative fetch, for the same address as that for which the speculative fetch is issued to when the response of the STR command is returned, is assumed to be Bτ. Further, in FIG. 3, "OLDDATA" means data before update, and "NEWDATA" means updated data. If a memory fetch is determined to be executed at least within the time period represented by Aτ+Bτ, the speculative fetch necessarily reads out NEWDATA after STR if a preceding STR for the same address has been issued, so that inconsistency does not occur. In view of this, the status update determination section 16 uses the time period represented by Aτ+Bτ as the monitoring time and determines whether the status in the management table 15 indicates "Accept" within the monitoring time.

Although the monitoring time is set to 54τ in the present embodiment, the length of the monitoring time is not especially limited.

The monitoring time, status transition in the management table 15, and adoption/discard of a packet will next be described collectively with reference to FIG. 4.

FIG. 4A shows an example in which the speculative fetch is succeeded. The speculative fetch output section 11 outputs a speculative fetch and, at the same time, the tag information search section 12 searches for tag information. At the time when the speculative fetch output section 11 outputs the speculative fetch, the status update section 14 updates the status of the speculative fetch in the management table 15 from "I" to "U".

The time monitoring starts when the status is updated to "U". When the search by the tag information search section 12 results in a cache miss within the monitoring time, the status of the speculative fetch in the management table 15 is updated from "U" to "A" by the status update section 14.

When acquiring data is acquired by the speculative fetch, the status update determination section 16 determines that the status in the management table 15 has been updated to "A" within the monitoring time. Since it has been determined that the status in the management table 15 has been updated to "A" by the status update determination section 16, the data adoption determination section 17 determines to adopt the data acquired by the speculative fetch.

Since the search results in a cache miss, data requested by the CPU 4 is not retained in the cache SX5. Thus, the data acquired by the speculative fetch is adopted. Therefore, in this case, a memory fetch (hereinafter, referred to as "normal fetch") to be issued after determination of a cache miss is not issued.

At the time when the data acquired by the speculative fetch is returned to the CPU 4, the status in the management table 15 is updated from "A" to the default status "I".

As described above, according to the SC of the present embodiment, the data acquired by the speculative fetch is returned to the CPU 4 only when the status of the speculative fetch in the management table indicates "A" within the monitoring time.

Next, examples in which the data acquired by the speculative fetch is not returned to the CPU 4 will be described with reference to FIGS. 4B to 4D.

FIG. 4B shows a case where a cache hit is determined within the monitoring time. When the search by the tag information search section 12 results in a cache hit, the status update section 14 updates the status of the speculative fetch in the management table from "U" to "C". Since the search results in a cache hit, data retained in the cache SX5 is adopted as is conventionally done.

In this case, the status update determination section 16 determines that the status has not been updated to "A" within the monitoring time, and the data adoption determination section 17 determines that the data acquired by the speculative fetch is unnecessary and discards it.

FIG. 4C shows a case where a cache miss is determined outside the monitoring time. In this case, the status of the speculative fetch in the management table 15 indicates "U" within the whole monitoring time, which means there is a possibility that the data acquired by the speculative fetch has passed the preceding STR command for the same address as described above. Thus, in the case where a cache miss has been determined outside the monitoring time as described above, the status update determination section 16 determines that the status has not been updated to "A" within the monitoring time, and the data adoption determination section 17 discards the data acquired by the speculative fetch.

FIG. 4C shows a case where a cache miss is determined outside the monitoring time. In this case, a normal fetch is issued at the time point when a cache miss is determined, and data acquired by the normal fetch is adopted.

FIG. 4D shows a case where a retry (SNP-RTRY) of the search (snooping) by the tag information search section 12 is determined within the monitoring time. In this case, a retry of the search is executed and, correspondingly, more time is required for the search, which increases a probability that a result of the search cannot be obtained within the monitoring time. Thus, in the SC 1 according to the present embodiment, data acquired by the speculative fetch is discarded without exception in the case where a retry of the search has occurred. At the time when the retry occurs, the status update section 14 updates the status in the management table 15 from "U" to "C".

When acquiring data is acquired by the speculative fetch, the status update determination section 16 determines that the status in the management table 15 has not been updated to "A" within the monitoring time, and the data adoption determination section 17 discards the data acquired by the speculative fetch. When a cache miss is determined afterward, a normal fetch is issued, and data acquired by the normal fetch is adopted.

As described above, in either case, it is possible to guarantee the ordering between requests for the same address by the status management using the management table 15 and time monitoring.

As described above, since success/failure of the speculative fetch is determined by the status and time monitoring, the speculative fetch involving long time search of the tag information search section 12 is unlikely to be processed within the monitoring time. To take much time in snooping means that an address lock register (address lock section 18) is filled. The address lock register has a function of locking an address at which a command such as the STR is being executed. A command for the address locked by the address lock register is not executed, resulting in occurrence of a snoop retry.

An upper limit is provided for the number of address lock registers The limit is 32 in the case of the present embodiment. Therefore, commands exceeding a predetermined number are prevented from being issued from the SC 1. Thus, the number of the address lock registers being used is monitored when the speculative fetch is output and, when the number of the address lock registers being used is more than a given threshold, the speculative fetch output section 11 does not output the speculative fetch. With this configuration, unnecessary issuance of the speculative fetch can be suppressed and a degradation of bus throughput can be prevented.

The SC 1 according to the present embodiment can guarantee the ordering between the speculative fetch and STR command which are issued for the same address with saved resources. Further, the SC 1 according to the present embodiment can reduce memory fetch latency. In addition, the SC 1 according to the present embodiment can increase the success rate of the speculative fetch by monitoring the number of the address lock registers being used.

What is claimed is:

1. A cache control apparatus comprising:
a speculative fetch output section that outputs a speculative fetch which is a memory fetch request output before it becomes clear whether data requested by a CPU is stored in a cache provided in the CPU;
a table that retains information concerning the speculative fetch and statuses of the speculative fetch;
a tag information search section that searches tag information including a list of information concerning data stored in the cache for cache hit information;
a status update section that updates, at the time of completion of the search by the tag information search section, the status of the speculative fetch in the table to a predetermined status in the case where the search results in a cache miss;
a status update determination section that determines, when acquiring data acquired by the speculative fetch output from the speculative fetch output section, whether the status of the speculative fetch retained in the table has been updated to the predetermined status by the status update section within a time period obtained by adding up a time period from when the speculative fetch is output to when the speculative fetch reaches a memory controller for controlling data communication between a memory and a device outside the memory and a time period from completion of writing of data to the memory which is specified by a data write command that has been issued before issuance of the speculative fetch, for the same address as that for which the speculative fetch is issued to when a response of the data write command is returned; and
a data adoption determination section that determines whether to adopt or not the data acquired by the speculative fetch output by the speculative fetch output section based on a result of the determination by the status update determination section.

2. The cache control apparatus according to claim 1, wherein
the speculative fetch output section outputs a speculative fetch at the timing at which the tag information search section starts the search for the tag information.

3. The cache control apparatus according to claim 1, wherein
the data adoption determination section adopts the data acquired by the speculative fetch output from the speculative fetch output section in the case where the status update determination section has determined that the status has been updated to the predetermined status and discards the data acquired by the speculative fetch output from the speculative fetch output section in the case where the status update determination section has determined that the status has not been updated to the predetermined status.

4. The cache control apparatus according to claim 1, further comprising an address lock section that retains, in the case where the data write command is being executed, the address of a data write destination specified by the command to lock access to the data write destination address, wherein
the speculative fetch output section does not output a speculative fetch in the case where the number of address that has been retained by the address lock section exceeds a predetermined value.

5. The cache control apparatus according to claim 1, further comprising a tag information retaining section that retains the tag information, wherein
the tag information search section searches the tag information retaining section for target tag information.

6. The cache control apparatus according to claim 1, wherein,
in the case where the search by the tag information search section results in failure and, correspondingly, the tag information search section executes the search once again, the data adoption determination section determines that the data acquired by the speculative fetch output from the speculative fetch output section is not adopted.

7. An information processing apparatus comprising:
at least one CPU containing a cache memory;
a memory that stores data;
a memory controller that controls data communication between the memory and a device outside the memory;
a speculative fetch output section that outputs a speculative fetch which is a memory fetch request output to the memory through the memory controller before it becomes clear whether data requested by the CPU is stored in the cache in the CPU;
a table that retains information concerning the speculative fetch and statuses of the speculative fetch;
a tag information search section that searches tag information concerning data stored in the cache memory;
a status update section that updates, at the time of completion of the search by the tag information search section, the status of the speculative fetch in the table to a predetermined status in the case where the search results in a cache miss;
a status update determination section that determines, when acquiring data acquired by the speculative fetch output from the speculative fetch output section, whether the status of the speculative fetch retained in the table has been updated to the predetermined status by the status update section within a time period obtained by adding up a time period from when the speculative fetch is output to when the speculative fetch reaches the memory controller and a time period from completion of writing of data to the memory which is specified by a data write command that has been issued, before issuance of the speculative fetch, for the same address as that for which the speculative fetch is issued to when a response of the data write command is returned; and
a data adoption determination section that determines whether to adopt or not the data acquired by the speculative fetch output by the speculative fetch output section based on a result of the determination by the status update determination section.

8. The information processing apparatus according to claim 7, wherein
the speculative fetch output section outputs a speculative fetch at the timing at which the tag information search section starts the search for the tag information.

9. The information processing apparatus according to claim 7, wherein
the data adoption determination section adopts the data acquired by the speculative fetch output from the speculative fetch output section in the case where the status update determination section has determined that the status has been updated to the predetermined status and discards the data acquired by the speculative fetch output from the speculative fetch output section in the case where the status update determination section has determined that the status has not been updated to the predetermined status.

10. The information processing apparatus according to claim 7, further comprising an address lock section that retains, in the case where the data write command is being executed, the address of a data write destination specified by the command to lock access to the data write destination address, wherein
the speculative fetch output section does not output a speculative fetch in the case where the number of address that has been retained by the address lock section exceeds a predetermined value.

11. The information processing apparatus according to claim 7, wherein,
in the case where the search by the tag information search section results in failure and, correspondingly, the tag information search section executes the search once again, the data adoption determination section determines that the data acquired by the speculative fetch output from the speculative fetch output section is not adopted.

12. A cache control method comprising:
outputting a speculative fetch which is a memory fetch request output before it is determined whether data requested by a CPU is stored in a cache memory;
searching tag information concerning data stored in the cache memory;
updating, at the time of completion of the tag information search, a status corresponding to the speculative fetch to a predetermined status in the case where the search results in a cache miss;
determining, when data is acquired based on the speculative fetch, whether the status of the speculative fetch has been updated to the predetermined status within a predetermined time period, the predetermined time period is obtained by adding up a first time period from when the speculative fetch is output to when the speculative fetch reaches a memory controller for controlling a memory, and a second time period from completion of writing of data to an address of the memory specified by a data write command issued before issuance of the speculative fetch, that is same as an address that for which the speculative fetch is issued to when a response of the data write command is issued; and
determining whether to adopt or not the data acquired by the speculative based on a result of the determination of the status update.

13. The cache control method according to claim 12, wherein
a speculative fetch is output at the timing at which the search for the tag information starts.

14. The cache control method according to claim 12, wherein
the data acquired by the speculative fetch is adopted in a case where it is determined that the status has been updated to the predetermined status, and
the data acquired by the speculative fetch is discarded in the case where it is determined the status has not been updated to the predetermined status.

15. The cache control method according to claim 12, further comprising:
retaining, in the case where the data write command is being executed, the address of a data write destination specified by the command to lock access to the data write destination address, wherein
a speculative fetch is not output in the case where the number of the retained address exceeds a predetermined value.

16. The cache control method according to claim 12, wherein
it is determined that the data acquired by the speculative fetch is not adopted, in the case where the search of the tag information results is failed and, correspondingly, the search of the tag information is executed once again.

* * * * *